United States Patent
Kobayashi

(10) Patent No.: US 10,417,311 B2
(45) Date of Patent: Sep. 17, 2019

(54) ELECTRONIC APPARATUS, PROGRAM, AND METHOD FOR CONTROLLING ELECTRONIC APPARATUS

(71) Applicant: SEIKO EPSON CORPORATION, Tokyo (JP)

(72) Inventor: Toshiya Kobayashi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/949,625

(22) Filed: Apr. 10, 2018

(65) Prior Publication Data

US 2018/0307657 A1 Oct. 25, 2018

(30) Foreign Application Priority Data

Apr. 25, 2017 (JP) .................................. 2017-085812

(51) Int. Cl.
  *G06F 17/00* (2019.01)
  *G06F 17/21* (2006.01)
  *G06F 3/0484* (2013.01)

(52) U.S. Cl.
  CPC ........ *G06F 17/214* (2013.01); *G06F 3/04845* (2013.01); *G06F 17/211* (2013.01)

(58) Field of Classification Search
  CPC .................................................. G06F 17/214
  See application file for complete search history.

(56) References Cited

U.S. PATENT DOCUMENTS

| 8,531,532 B2* | 9/2013 | Imamura | G06F 17/214 345/204 |
|---|---|---|---|
| 2002/0036788 A1* | 3/2002 | Hino | G06F 17/214 358/1.11 |
| 2007/0055931 A1* | 3/2007 | Zaima | G06F 17/2258 715/206 |
| 2008/0150947 A1* | 6/2008 | Suzuki | G06F 17/214 345/472 |
| 2008/0177994 A1* | 7/2008 | Mayer | G06F 9/4418 713/2 |
| 2008/0276165 A1* | 11/2008 | Aono | G09G 5/00 715/248 |
| 2009/0153564 A1* | 6/2009 | Imai | G06T 3/00 345/471 |

(Continued)

FOREIGN PATENT DOCUMENTS

| JP | 2003-333449 A | 11/2003 |
|---|---|---|
| JP | 2009-146284 A | 7/2009 |

(Continued)

*Primary Examiner* — Laurie A Ries
(74) *Attorney, Agent, or Firm* — Oliff PLC

(57) ABSTRACT

An electronic apparatus includes: a display unit; a display data generation unit which generates display data including information of display content and information of layout, based on a data file; and a display control unit which causes the display unit to display an image based on the display data generated by the display data generation unit. The display control unit causes the display unit to display a character included in the display data, changing a font size of the character to a second font size that is different from a first font size set based on at least one of the information of display content and the information of layout.

13 Claims, 6 Drawing Sheets

(56) References Cited

U.S. PATENT DOCUMENTS

| | | | | |
|---|---|---|---|---|
| 2009/0222761 A1* | 9/2009 | Hayashi | .................... | G06F 3/14 |
| | | | | 715/781 |
| 2010/0328317 A1* | 12/2010 | Lindfors | .................. | G06T 3/40 |
| | | | | 345/468 |
| 2011/0128291 A1* | 6/2011 | Miyazawa | ............ | G06F 17/214 |
| | | | | 345/471 |
| 2011/0191671 A1* | 8/2011 | Hammond | ............ | G06F 17/214 |
| | | | | 715/269 |
| 2011/0261210 A1* | 10/2011 | Imamura | ............... | G06F 17/214 |
| | | | | 348/207.1 |
| 2013/0159841 A1* | 6/2013 | Yokoyama | ......... | H04N 1/00411 |
| | | | | 715/243 |
| 2014/0337694 A1* | 11/2014 | Haramaty | ............. | G06F 16/958 |
| | | | | 715/204 |
| 2014/0344669 A1* | 11/2014 | Kawara | ................ | G06F 17/214 |
| | | | | 715/234 |
| 2015/0370526 A1* | 12/2015 | Inagaki | ................ | H04N 9/3188 |
| | | | | 345/661 |

FOREIGN PATENT DOCUMENTS

| | | |
|---|---|---|
| JP | 2009-211241 A | 9/2009 |
| JP | 2014-106769 A | 6/2014 |
| JP | 2016-09023 A | 1/2016 |
| JP | 2016-63433 A | 4/2016 |

\* cited by examiner

ELECTRONIC APPARATUS, PROGRAM, AND METHOD FOR CONTROLLING ELECTRONIC APPARATUS

BACKGROUND

1. Technical Field

The present invention relates to an electronic apparatus, a program, and a method for controlling an electronic apparatus.

2. Related Art

Recently, a system has been widely used in which an electronic apparatus processes a data file, displays the processed data file on a display unit, and transmits image data generated from the data file to a display device, so that the electronic apparatus and the display device display the same screen (see, for example, JP-A-2016-9023).

Incidentally, if an electronic apparatus converts the format of a data file and displays the file in the converted format, for example, a change in the font in the format conversion may break the layout of the image displayed by the electronic apparatus. In this case, the way the image looks changes and thus may make the user of the electronic apparatus feel that something is wrong.

SUMMARY

An advantage of some aspects of the invention is that the breaking of the layout is reduced when an electronic apparatus displays a data file whose format is converted.

An aspect of the invention is directed to an electronic apparatus including: a display unit; a display data generation unit which generates display data including information of display content and information of layout, based on a data file; and a display control unit which causes the display unit to display an image based on the display data generated by the display data generation unit. The display control unit causes the display unit to display a character included in the display data, changing a font size of the character to a second font size that is different from a first font size set based on at least one of the information of display content and the information of layout.

According to the aspect of the invention, when the display data generated on the data file is displayed on the display unit, the font size of the character included in the display data is changed to a different size from the font size that is set based on at least one of the information of display content and the information of layout.

When the display data is generated based on the data file, for example, a change in the font, insertion of an unnecessary line feed or the like may be carried out if the font prescribed for the data file is not prepared in the electronic apparatus. This may break the layout when the display data is displayed. With the above configuration, the font size of the character included in the display data is changed to the second font size, which is different from the first font size set based on at least one of the information of display content and the information of layout. Therefore, in the generation of the display data, the breaking of the layout of what is displayed on the display unit can be reduced even if a change in the font, insertion of an unnecessary line feed or the like is carried out.

In the aspect of the invention, if the display data includes image data, the display control unit may cause the display unit to display the character, changing the font size of the character to a second font size that is smaller than a first font size set based on at least one of the information of display content and the information of layout, without changing a size of the image data.

According to the aspect of the invention with this configuration, if the display data includes image data, the font size of the character is changed to the second font size, which is smaller than the first font size set based on at least one of the information of display content and the information of layout, without changing the size of the image data. Therefore, the breaking of the layout of what is displayed on the display unit can be reduced.

In the aspect of the invention, if the data file is in a preset file format, the display control unit may cause a size designation screen to be displayed to designate a font size of a character included in an image based on the display data displayed on the display unit.

According to the aspect of the invention with this configuration, if the data file is in a preset file format, the size designation screen to designate a font size is displayed. Therefore, the font size of the character included in the image based on the display data can be designated on the size designation screen.

In the aspect of the invention, the electronic apparatus may include an accepting unit which accepts an operation, in which, when the accepting unit accepts an operation on the size designation screen, the display control unit may change the font size of the character to a second font size that is smaller than a first font size set based on at least one of the information of display content and the information of layout.

According to the aspect of the invention with this configuration, when an operation on the size designation screen is accepted, the font size of the character is changed to the second font size, which is smaller than the first font size set based on at least one of the information of display content and the information of layout. Therefore, the breaking of the layout of what is displayed on the display unit can be reduced.

In the aspect of the invention, the electronic apparatus may further include: an image data generation unit which generates image data to be displayed by a display device, based on the display data; and a transmission unit which transmits the image data generated by the image data generation unit to the display device.

According to the aspect of the invention with this configuration, based on the display data, image data can be generated and transmitted to the display device.

Another aspect of the invention is directed to a program which is executed by a computer installed in an electronic apparatus and causes the computer to execute: a generation procedure to generate display data including information of display content and information of layout, based on a data file; and a display procedure to cause a display unit provided in the electronic apparatus to display an image based on the display data generated by the generation procedure. The display procedure includes causing the display unit to display a character included in the display data, changing a font size of the character to a second font size that is different from a first font size set based on at least one of the information of display content and the information of layout.

According to the aspect of the invention, when the display data generated based on the data file is displayed on the display unit, the font size of the character included in the display data is changed to a different size from the font size that is set based on at least one of the information of display content and the information of layout.

When the display data is generated based on the data file, for example, a change in the font, insertion of an unnecessary line feed or the like may be carried out if the font prescribed for the data file is not prepared in the electronic apparatus. This may break the layout when the display data is displayed. With the above configuration, the font size of the character included in the display data is changed to the second font size, which is different from the first font size set based on at least one of the information of display content and the information of layout. Therefore, in the generation of the display data, the breaking of the layout of what is displayed on the display unit can be reduced even if a change in the font, insertion of an unnecessary line feed or the like is carried out.

In the aspect of the invention, if the display data includes image data, the display procedure may cause the display unit to display the character, changing the font size of the character to a second font size that is smaller than a first font size set based on at least one of the information of display content and the information of layout, without changing a size of the image data.

According to the aspect of the invention with this configuration, if the display data includes image data, the font size of the character is changed to the second font size, which is smaller than the first font size set based on at least one of the information of display content and the information of layout, without changing the size of the image data. Therefore, the breaking of the layout of what is displayed on the display unit can be reduced.

In the aspect of the invention, if the data file is in a preset file format, the display procedure may cause a size designation screen to be displayed to designate a font size of a character included in an image based on the display data displayed on the display unit.

According to the aspect of the invention with this configuration, if the data file is in a preset file format, the size designation screen to designate a font size is displayed. Therefore, the font size of the character included in the image based on the display data can be designated on the size designation screen.

In the aspect of the invention, the electronic apparatus may include an accepting unit which accepts an operation, in which the display procedure may change the font size of the character to a second font size that is smaller than a first font size set based on at least one of the information of display content and the information of layout, when the accepting unit accepts an operation on the size designation screen.

According to the aspect of the invention with this configuration, when an operation on the size designation screen is accepted, the font size of the character is changed to the second font size, which is smaller than the first font size set based on at least one of the information of display content and the information of layout. Therefore, the breaking of the layout of what is displayed on the display unit can be reduced.

In the aspect of the invention, the program may further include: an image data generation procedure to generate image data to be displayed by a display device, based on the display data; and a transmission procedure to transmit the image data generated by the image data generation procedure to the display device.

According to the aspect of the invention with this configuration, based on the display data, image data can be generated and transmitted to the display device.

Another aspect of the invention is directed to a method for controlling an electronic apparatus including: generating display data including information of display content and information of layout, based on a data file; and causing a display unit provided in the electronic apparatus to display an image based on the display data generated by the generating. The causing to display includes causing the display unit to display a character included in the display data, changing a font size of the character to a second font size that is different from a first font size set based on at least one of the information of display content and the information of layout.

According to the aspect of the invention, when the display data generated on the data file is displayed on the display unit, the font size of the character included in the display data is changed to a different size from the font size that is set based on at least one of the information of display content and the information of layout.

When the display data is generated based on the data file, for example, a change in the font, insertion of an unnecessary line feed or the like is carried out if the font prescribed for the data file is not prepared in the electronic apparatus. This may break the layout when the display data is displayed. With the above configuration, the font size of the character included in the display data is changed to the second font size, which is different from the first font size set based on at least one of the information of display content and the information of layout. Therefore, in the generation of the display data, the breaking of the layout of what is displayed on the display unit can be reduced even if a change in the font, insertion of an unnecessary line feed or the like is carried out.

In the aspect of the invention, the causing to display may include, if the display data includes image data, causing the display unit to display the character, changing the font size of the character to a second font size that is smaller than a first font size set based on at least one of the information of display content and the information of layout, without changing a size of the image data.

According to the aspect of the invention with this configuration, if the display data includes image data, the font size of the character is changed to the second font size, which is smaller than the first font size set based on at least one of the information of display content and the information of layout, without changing the size of the image data. Therefore, the breaking of the layout of what is displayed on the display unit can be reduced.

In the aspect of the invention, the causing to display may include causing a size designation screen to be displayed to designate a font size of a character included in an image based on the display data displayed on the display unit, if the data file is in a preset file format.

According to the aspect of the invention with this configuration, if the data file is in a preset file format, the size designation screen to designate a font size is displayed. Therefore, the font size of the character included in the image based on the display data can be designated on the size designation screen.

In the aspect of the invention, the electronic apparatus may include an accepting unit which accepts an operation, in which the causing to display may include changing the font size of the character to a second font size that is smaller than a first font size set based on at least one of the information of display content and the information of layout, when the accepting unit accepts an operation on the size designation screen.

According to the aspect of the invention with this configuration, when an operation on the size designation screen is accepted, the font size of the character is changed to the second font size, which is smaller than the first font size set based on at least one of the information of display content and the information of layout. Therefore, the breaking of the layout of what is displayed on the display unit can be reduced.

In the aspect of the invention, the method may further include: generating image data to be displayed by a display device, based on the display data; and transmitting the image data generated by the generating to the display device.

According to the aspect of the invention with this configuration, based on the display data, image data can be generated and transmitted to the display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
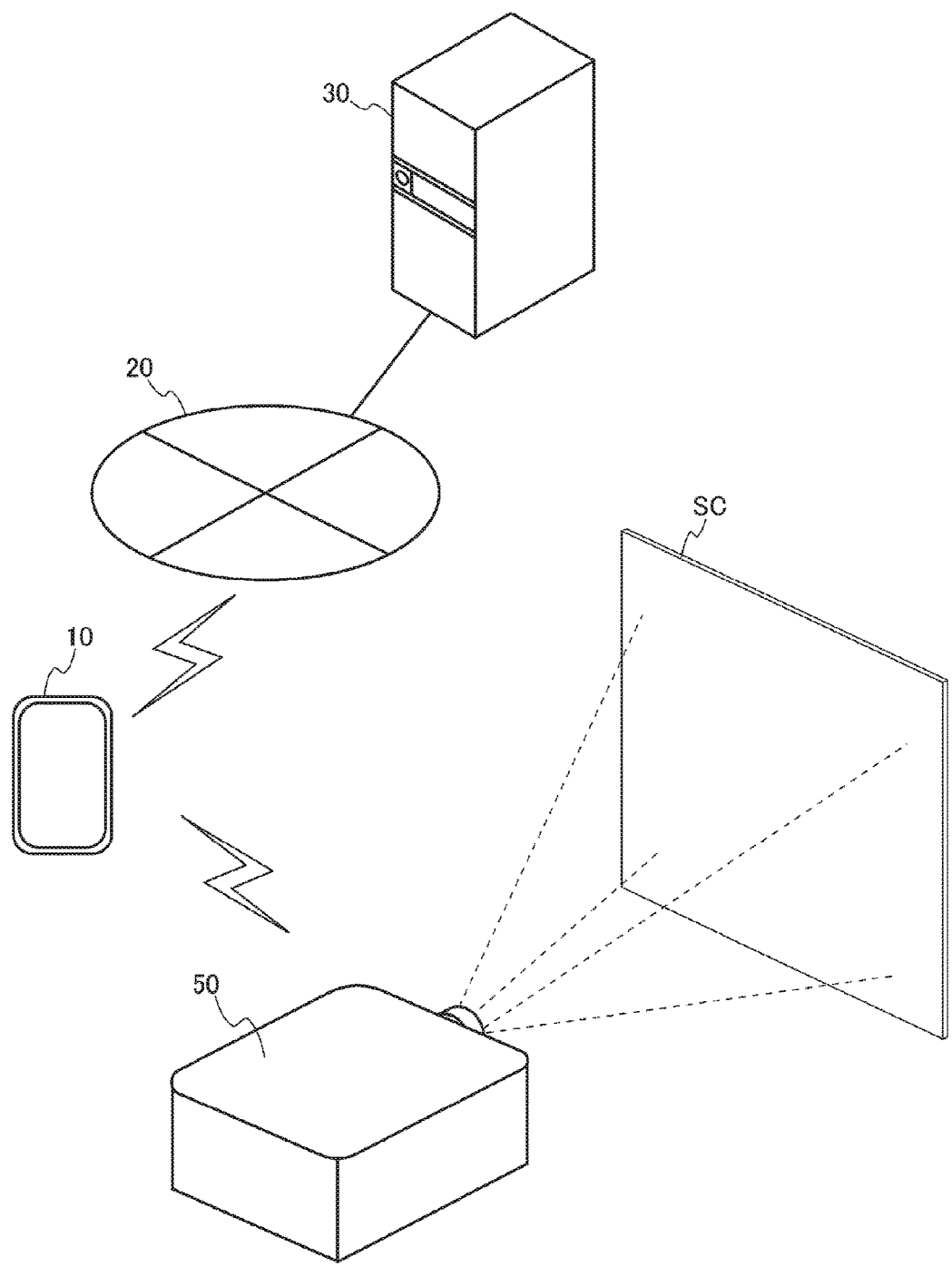
FIG. 1 shows a system configuration according to an embodiment.

FIG. 1 shows the system configuration of a system including an electronic apparatus 10.

A network 20 is connected to the electronic apparatus 10 via a mobile communication line network (not illustrated). A server device 30 is connected to the network 20. The network 20 is constructed, for example, by the internet, a LAN (local area network), WAN (wide area network) dedicated communication line, mobile communication network (including a base station or the like), gateway, or the like.

The electronic apparatus 10 is also connected wirelessly to a projector 50. The method of wireless communication between the electronic apparatus 10 and the projector 50 may be a method conforming to a wireless communication standard such as wireless LAN or Wi-Fi (trademark registered) Direct. The wireless communication method may also be a method conforming to a short-range wireless communication standard such as Bluetooth (trademark registered) or BLE (Bluetooth Low Energy).

The server device 30 stores web content. The web content stored in the server device 30 is content uploaded by the user of the electronic apparatus 10. The web content includes, for example, a document file including a Word (trademark registered), Excel (trademark registered) or Power Point (trademark registered) document, an audio file including audio data, an image file including a still image or dynamic image, or the like. The server device 30 also stores authentication information such as a user ID or password to authenticate a user. The server device 30 stores the web content uploaded by each user, in association with a user ID.

On receiving a web content acquisition request from the electronic apparatus 10, the server device 30 requests the electronic apparatus 10 of the sender of this acquisition request to transmit authentication information. On receiving authentication information from the electronic apparatus 10, the server device 30 collates the received authentication information with the authentication information stored in the server device 30 and thus carries out authentication processing. After authenticating the user, the server device 30 causes the electronic apparatus 10 to display a list of web content associated with the user ID of the authenticated user, and downloads selected web content to the electronic apparatus 10.

Figure 2:
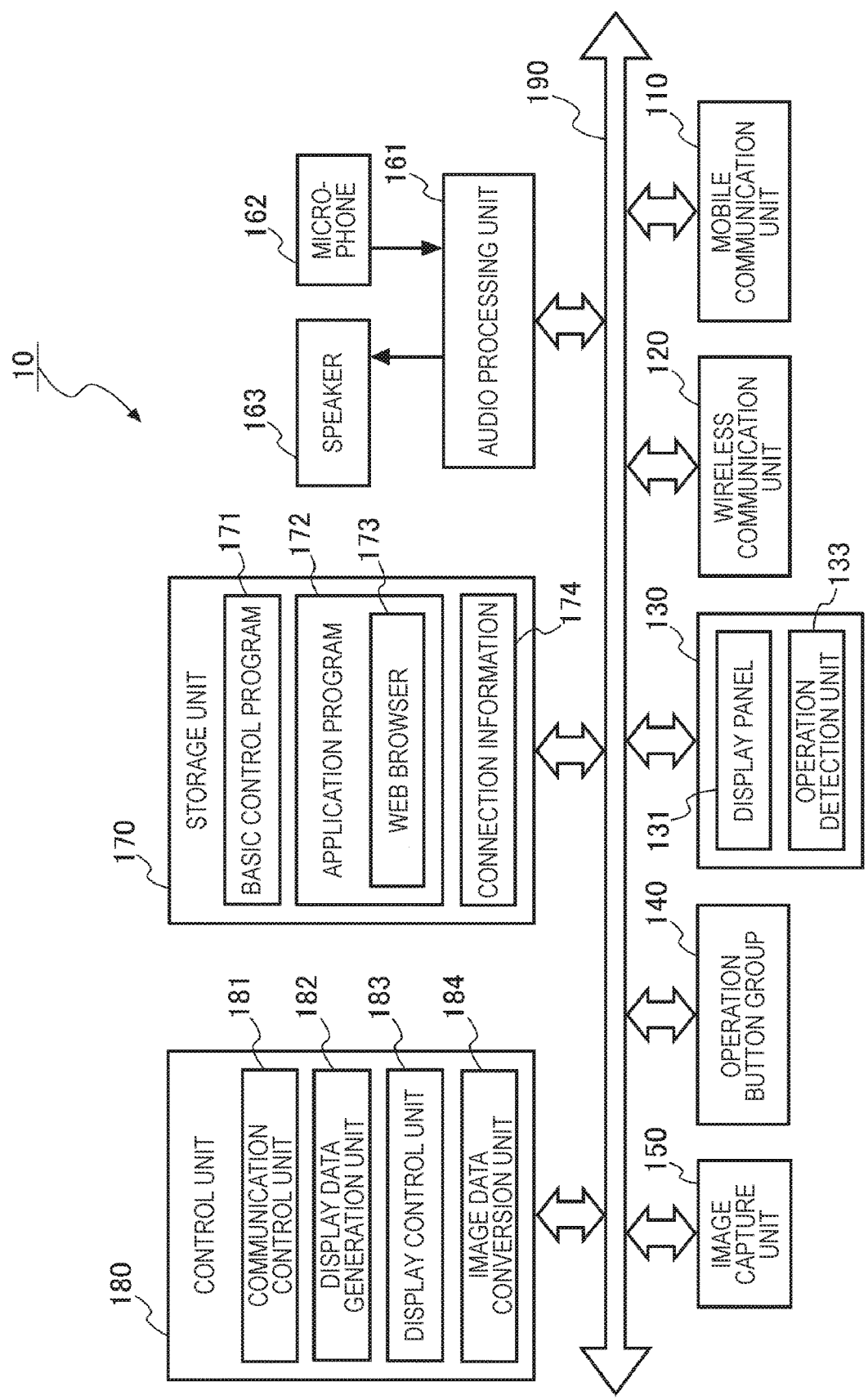
FIG. 2 shows the configuration of an electronic apparatus.

FIG. 2 shows the configuration of the electronic apparatus 10.

The electronic apparatus 10 is a terminal that can be carried by the user. For example, a smartphone, PDA (personal digital assistant), tablet terminal, notebook computer or the like can be used as the electronic apparatus 10. In the description below, a case where a smartphone is used as the electronic apparatus 10 will be described as an example.

The electronic apparatus 10 has a mobile communication unit 110, a wireless communication unit 120, a display unit 130, an operation button group 140, an image capture unit 150, an audio processing unit 161, a microphone 162, a speaker 163, a storage unit 170, and a control unit 180. These units are connected via a bus 190. Although not shown in FIG. 2, the electronic apparatus 10 can also be equipped with functions installed in a smartphone such as an acceleration sensor, GPS sensor, or vibrator. The wireless communication unit 120 is equivalent to the "transmission unit" according to the invention.

The mobile communication unit 110 has an antenna, a wireless communication circuit or the like (none of which is illustrated). The mobile communication unit 110, under the control of the control unit 180, connects to a mobile communication network and carries out mobile communication. The mobile communication network is connected to the network 20 (see FIG. 1) such as the internet. The communication method of the mobile communication unit 110 may be 3G (third-generation mobile communication system), LTE (Long Term Evolution; LTE is a trademark registered), or 4G (fourth-generation mobile communication system).

The wireless communication unit 120 has an antenna, an RF (radio frequency) circuit or the like (none of which is illustrated). The wireless communication unit 120 executes wireless communication with an external device under the control of the control unit 180. The wireless communication method of the wireless communication unit 120 may be a method conforming to a wireless communication standard such as wireless LAN or Wi-Fi Direct. The wireless communication method of the wireless communication unit 120 may also be a method conforming to a short-range wireless communication standard such as Bluetooth or BLE (Bluetooth Low Energy).

The display unit 130 has a display panel 131 and an operation detection unit 133.

The display panel 131 is configured of a liquid crystal panel, organic EL panel or the like. The display unit 130, under the control of the control unit 180, causes the display panel 131 to display a GUI (graphical user interface) image such as a window, icon or button. Also, the display unit 130, under the control of the control unit 180, causes the display panel 131 to display the web content downloaded from the server device 30.

The operation detection unit 133 has a touch sensor (not illustrated) arranged on the display panel 131. The operation detection unit 133 detects a position touched by a user's finger or touch pen on the display panel 131 and outputs coordinate information indicating the detected touch position to the control unit 180. The coordinate information is coordinate information of coordinates associated with the display surface of the display panel 131. The control unit 180 specifies the operation by the user, based on the coordinate information detected by the operation detection unit 133, and based on, for example, the GUI image displayed on the display panel 131, and executes various kinds of processing corresponding to the specified operation. The display panel 131 and the operation detection unit 133 form a touch panel. An operation in which the user points at the display surface of the display panel 131 with a finger, touch pen or the like is referred to as a touch operation.

The operation button group 140 is buttons as hardware operated by the user and includes, for example, a power button to switch on and off of the power of the electronic apparatus 10, a home button, a back button, a menu button or the like.

The image capture unit 150 has an image pickup element or the like, such as a CCD (charge coupled device) or CMOS (complementary metal oxide semiconductor) sensor. The image capture unit 150 generates captured image data of an object captured in an image and outputs the captured image data to the control unit 180.

The audio processing unit 161 modulates and demodulates an audio signal. The audio processing unit 161 modulates an audio signal inputted from the microphone 162 and outputs the modulated audio signal to the control unit 180. The audio processing unit 161 also outputs the audio signal to the speaker 163. The audio processing unit 161 is implemented, for example, by a processor for audio processing.

The microphone 162 accepts an audio input and outputs an audio signal corresponding to the accepted audio input to the audio processing unit 161. The speaker 163 converts the audio signal inputted from the audio processing unit 161 into a sound and emits the converted sound to the outside of the electronic apparatus 10.

The storage unit 170 is a non-volatile storage device such as a flash memory or EEPROM (electronically erasable and programmable read-only memory). The storage unit 170 stores a basic control program (OS (operating system)) 171 and an application program 172. Particularly in this embodiment, the storage unit 170 stores a web browser 173 as one of the application programs 172. The basic control program 171 and the application program 172 are equivalent to the "program" according to the invention. The storage unit 170 is also used as a work area to temporarily store data resulting from the processing by the control unit 180.

The storage unit 170 also stores connection information 174. The connection information 174 is information to connect the electronic apparatus 10 to an access point (not illustrated). The connection information 174 includes information such as an SSID (service set identifier) to identify the access point, the standard used (802.11a, 802.11n or the like), the channel used, and the encryption method and encryption key.

The control unit 180 has, for example, a CPU (central processing unit). The control unit 180 is equivalent to the computer installed in the electronic apparatus. The control unit 180 executes a command included in the execution of the basic control program 171 and the application program 172 stored in the storage unit 170, referring to data stored in the storage unit 170 according to need. The control unit 180 thus comprehensively controls the operation of the electronic apparatus 10 and implements various functions of the electronic apparatus 10.

The control unit 180 has a communication control unit 181, a display data generation unit 182, a display control unit 183, and an image data conversion unit 184, as its functional blocks.

The communication control unit 181 controls the mobile communication unit 110 and thus implements a communication function such as audio calls and data communication via a mobile communication network. The communication control unit 181 also connects to an access point (not illustrated), using the connection information 174, and thus carries out wireless communication via a wireless LAN with the projector 50 similarly connecting to the access point. The communication control unit 181 is equivalent to the "transmission unit" according to the invention.

The display data generation unit 182 downloads web content designated by the user from the server device 30 and converts the file format of the downloaded web content.

Specifically, if the downloaded web content is a document file for Word, Excel, Power Point or the like, the display data generation unit 182 converts the document file into data that configures a web page. The document file is equivalent to the "data file" according to the invention. The data that configures a web page is equivalent to the "display data" according to the invention. The data configuring a web page includes an HTML file described in HTML (hyper text markup language), a CSS (cascading style sheets) file, a Java Script (trademark registered) code, image data and the like. The HTML file includes an HTML header in which a title of the web page, the character code used, link information, and the style of each element in the web page or the like is described. The HTML file also includes an HTML body, which is text data describing a document that is the main text of the web page. CSS file is a file designating a display style of display elements such as an image, character and symbol in the web page. The CSS file is not an essential configuration to the data forming the web page. For example, if the style of each element in the web page is described in the HTML file, the CSS file is unnecessary.

The HTML file is equivalent to the "information of display content", or the "information of display content" and the "information of layout" according to the invention. The CSS file is also equivalent to the "information of layout" according to the invention.

The display control unit 183 analyzes the HTML file and the CSS file included in the data forming the web page converted by the display data generation unit 182, and decides a layout of the web page, based on the result of the analysis. The display control unit 183 causes the display panel 131 to display the web page with the layout thus decided.

Figure 3:
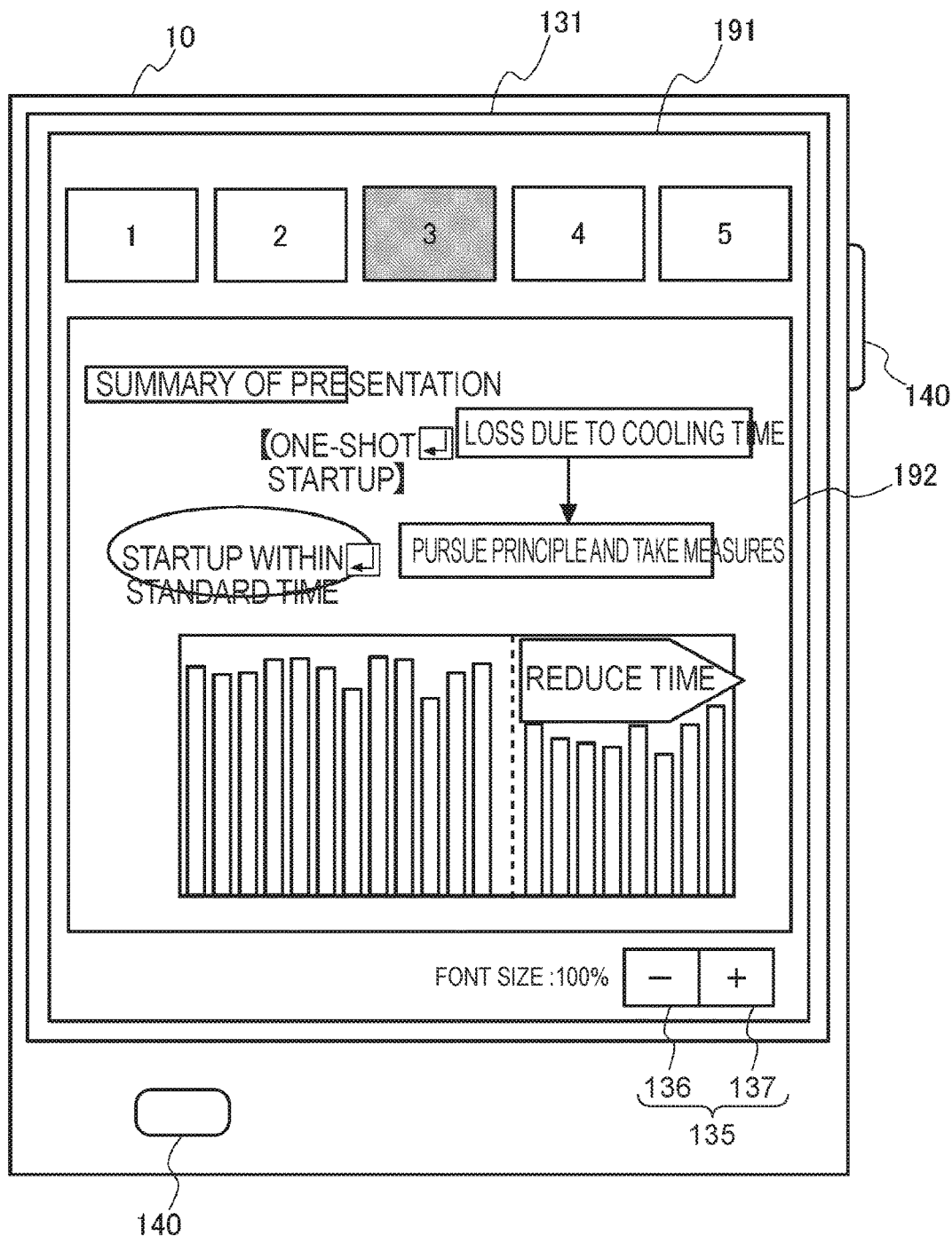
FIG. 3 shows an application screen.
Figure 4:
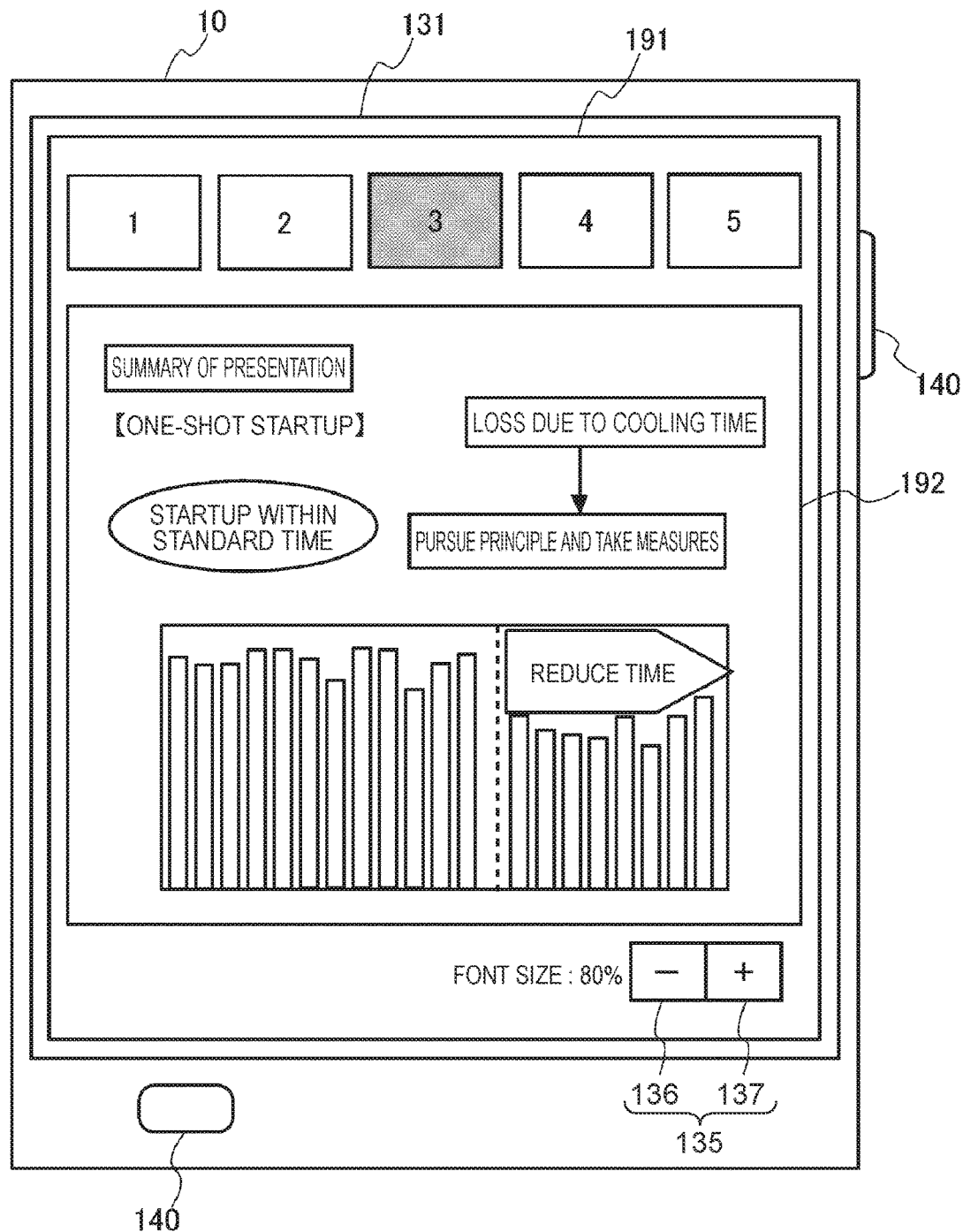
FIG. 4 shows an application screen.

FIGS. 3 and 4 show a screen (hereinafter referred to as an application screen) 191 displayed on the display panel 131.

When an application program 172 is selected by a touch operation or an operation on the operation button group 140, the control unit 180 executes the selected application program 172. Here, the selected application program 172 is a program which connects the electronic apparatus 10 to the projector 50 via a wireless LAN. The selected application program 172 is also a program which causes the display panel 131 to display a web page selected with an operation by the user, converts the displayed web page into image data, and transmits the image data to the projector 50. On receiving the image data from the electronic apparatus 1, the projector 50 processes the received image data and projects the resulting image onto the screen SC, which is a projection target. Hereinafter, this application program is referred to as a projection application.

When the projection application is selected, the control unit 180 executes the projection application and causes the display unit 130 to display the application screen 191 shown in FIG. 3.

When the application screen 191 is displayed on the display unit 130, the user selects content to be displayed on the application screen 191 by a touch operation or an operation on the operation button group 140. The content that can be selected by a touch operation or an operation on the operation button group 140 includes content stored in the storage unit 170 of the electronic apparatus 10 and web content stored in the server device 30. When web content is selected by the user's touch operation, the control unit 180 connects to the server device 30. On receiving an authentication information acquisition request from the connected server device 30, the control unit 180 causes a screen requesting input of authentication information to be displayed on the application screen 191. When authentication information is inputted on the displayed screen, the control unit 180 transmits the inputted authentication information to the server device 30.

When authentication processing is successful, the control unit 180 causes the server device 30 to display a list of web content stored in association with the user ID of the user. When web content is selected from the list of web content, the control unit 180 downloads the selected web content from the server device 30.

If the downloaded web content is a document file, the control unit 180 causes the display data generation unit 182 to convert the document file into data forming a web page. Meanwhile, if content stored in the storage unit 170 is selected by the user's touch operation and this content is a document file, the control unit 180 converts the document file into data forming a web page. In the file conversion, if the font prescribed for the document file is not prepared in the basic control program 171, the display data generation unit 182 changes the font. That is, the display data generation unit 182 generates data forming a web page, using a font other than the font prescribed for the document included in the document file.

When the data forming the web page is generated, the control unit 180 causes the display control unit 183 to analyze the data forming the web page and causes the display unit 130 to display the web page.

In the application screen 191, a screen (hereinafter referred to as a web page screen) 192 to display a web page is displayed as shown in FIG. 3. The web page screen 192 is a screen where the web browser 173 analyzes and displays the data forming the web page. The web browser 173 analyzes an HTML file or CSS file included in the data forming the web page, decides a layout, and causes the web page to be displayed with the decided layout on the web page screen 192. The font size of a character included in this web page is equivalent to the "first font size" according to the invention.

If the font is changed when data forming a web page is generated from a document file, as described above, the layout of the web page displayed on the web page screen 192 is broken, as shown in FIG. 3. This phenomenon occurs because the change in the font causes the character string to go beyond the character frame prescribed for the document file, resulting in the insertion of an unintended line feed or the like.

A font size adjustment display section 135 which enables a change in the font size of the web page displayed on the web page screen 192 is displayed on the application screen 191. The font size adjustment display section 135 is equivalent to the "accepting unit" according to the invention. The application screen 191 where the font size adjustment display section 135 is displayed is equivalent to the "size designation screen" according to the invention.

If the downloaded web content is a document file, the display control unit 183 causes the font size adjustment display section 135 to be displayed on the application screen 191. The font size adjustment display section 135 includes the font size (relative value) of the web page displayed on the web page screen 192, a reduction button 136 to reduce the font size of the web page, and an enlargement button 137 to increase the font size. The reduction button 136 and the enlargement button 137 are equivalent to the "accepting unit" according to the invention.

When the layout of the web page displayed on the web page screen 192 is broken, the reduction button 136 or the enlargement button 137 of the font size adjustment display section 135 may be operated to change the font size, thus correcting the breaking of the layout.

The designation of a font size by the reduction button 136 and the enlargement button 137 can be set in the form of a relative value. The font size is reduced at a predetermined rate every time the reduction button 136 is pressed once. For example, if the reduction button 136 is pressed once, the font size is changed to a size 5% smaller than the previous font size before the pressing of the reduction button 136. If the reduction button 136 is pressed once again, the font size is changed to a size 5% smaller than the font size obtained when the reduction button 136 is pressed once. The font size obtained by pressing the reduction button 136 is equivalent to the "second font size" according to the invention. Also, the font size is increased by 5% every time the enlargement button 137 is pressed once. That is, if the enlargement button 137 is pressed once, the font size is changed to a size 5% larger than the previous font size before the pressing of the enlargement button 137. If the enlargement button 137 is pressed once again, the font size is changed to a size 5% larger than the font size obtained when the enlargement button 137 is pressed once.

When the reduction button 136 or the enlargement button 137 is pressed, the display control unit 183 reduces or enlarges the font size according to the pressed button 136 or 137. The display control unit 183 changes the font size to a size (second font size) that is different from the font size prescribed based on the HTML file or CSS file (first font size).

For example, the display control unit 183 rewrites the style attribute of the body tag of the HTML file and thus changes the font size. The Java Script code to be executed is, for example, "document.body.style.webkitTextSizeAdjust='xx%'". The display control unit 183 inputs a relative value of the designated font size to the "xx%" part and thus changes the font size. At this point, if the web page includes image data, the display control unit 183 only changes the font size without changing the size of the image data.

FIG. 4 shows the web page screen 192 after the change in the font size of the web page.

As the font size is changed to a smaller size, the breaking of the layout can be reduced even if an unnecessary line feed is inserted in the character strings. The user operates the reduction button 136 to reduce the font size until the braking of the layout of the web page displayed on the web page screen 192 is improved.

The image data conversion unit 184 generates image data to be projected by the projector 50, based on the data forming the web page. For example, the image data conversion unit 184 converts the data forming the web page into JPEG image data or the like. The image data conversion unit 184 sends the converted image data to the communication control unit 181. The communication control unit 181 controls the wireless communication unit 120 to transmit the image data to the projector 50.

Figure 5:
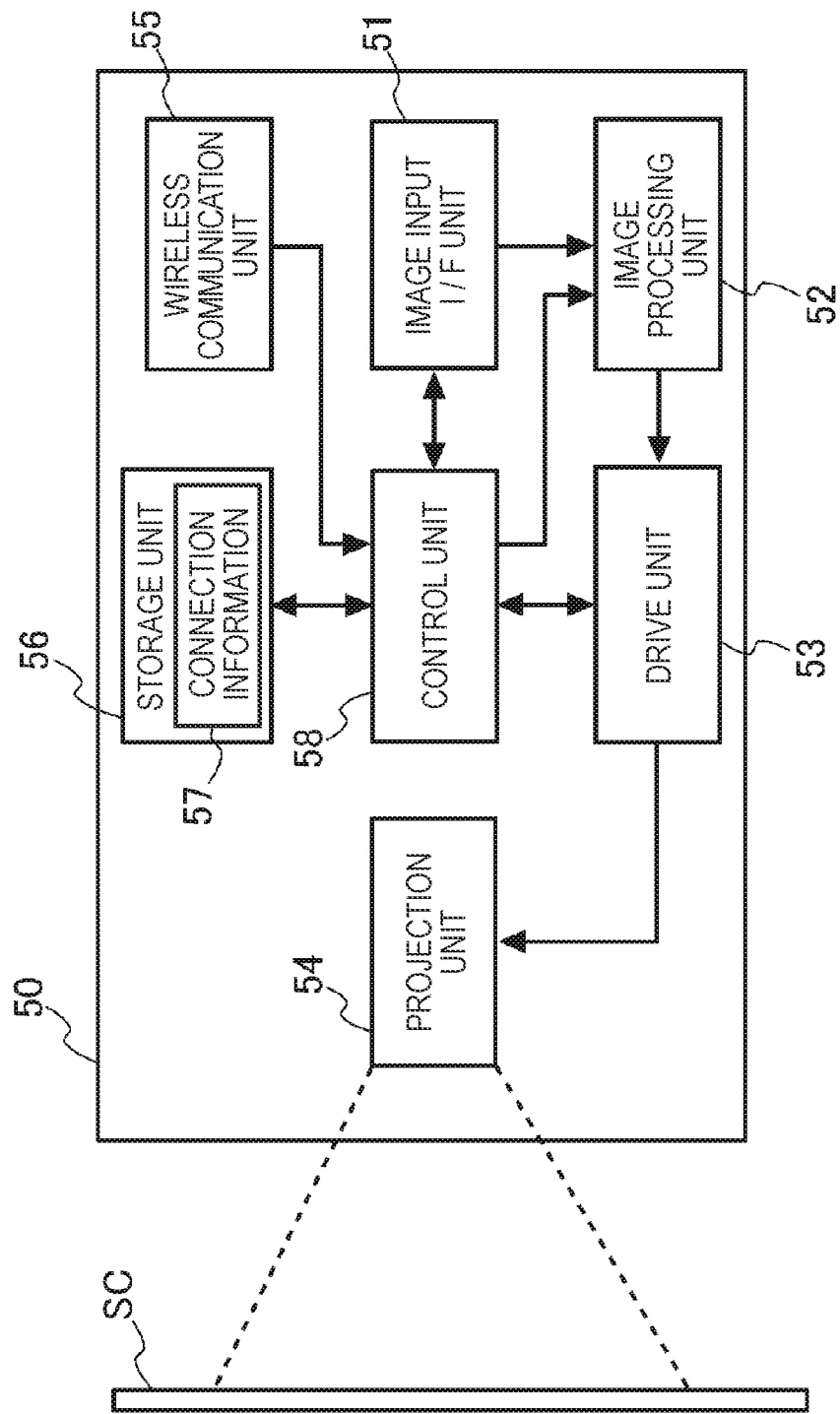
FIG. 5 shows the configuration of a projector.

FIG. 5 shows the configuration of the projector 50.

The projector 50 has an image input I/F unit 51, a projection unit 54, a drive unit 53, a wireless communication unit 55, a storage unit 56, and a control unit 58.

The image input I/F unit 51 has a connector for wired connection and an interface circuit corresponding to this connector. The image input I/F unit 51 is wired to an image supply device (not illustrated) which supplies image data to the projector 50. The image input I/F unit 51 outputs image data inputted from the image supply device, to an image processing unit 52.

The image processing unit 52 has a frame memory (not illustrated) and unfolds the inputted image data to the frame memory. The image processing unit 52 carries out image processing on the image data unfolded in the frame memory, such as resolution conversion (scaling), resizing, shape correction including distortion correction or the like, digital zooming, color tone correction, and luminance correction. The image data processed by the image processing unit 52 is outputted to the drive unit 53. The drive unit 53 drives the projection unit 54 to project an image based on the image data, onto the screen SC.

The projection unit 54 has a light source, a light modulation device, a projection system or the like (none of which is illustrated). The light modulation device has, for example, a liquid crystal panel. The drive unit 53 causes an image to be drawn on the liquid crystal panel, based on the image data inputted from the image processing unit 52. The light emitted from the light source is transmitted through the liquid crystal panel where the image is drawn. The light is thus modulated into light corresponding to the image (hereinafter referred to as image light). The image light modulated by the light modulation device is projected onto the screen SC by the projection system.

The wireless communication unit 55 has an antenna, an RF (radio frequency) circuit or the like, not illustrated. The wireless communication unit 55, under the control of the control unit 58, executes wireless communication with the electronic apparatus 10. The wireless communication method of the wireless communication unit 55 may be, for example, a method conforming to a wireless communication standard such as wireless LAN or Wi-Fi Direct, or may be a method conforming to a short-range wireless communication standard such as Bluetooth or BLE.

The storage unit 56 is a non-volatile storage device and temporarily stores a control program executed by the control unit 58 and data resulting from processing by the control unit 58. The storage unit 56 also stores connection information 57. The connection information 57 is information to connect the projector 50 to an access point (not illustrated). The connection information 57 includes information such as an SSID (service set identifier) to identify the access point, the standard used (802.11a, 802.11n or the like), the channel used, and the encryption method and encryption key.

The control unit 58 connects to the access point (not illustrated), using the connection information 57, and wirelessly communicates via a wireless LAN with the projector 50 similarly connecting to the access point. The control unit 58 also controls the image processing unit 52 and thus causes the image processing unit 52 to process the image data. At this point, the control unit 58 reads out a necessary parameter for the processing by the image processing unit 52 and outputs the parameter to the image processing unit 52. The control unit 58 also controls the drive unit 53 and thus causes an image to be drawn on the liquid crystal panel provided in the projection unit 54. The control unit 58 also controls the drive unit 53 and thus causes the light source to turn on.

Figure 6:
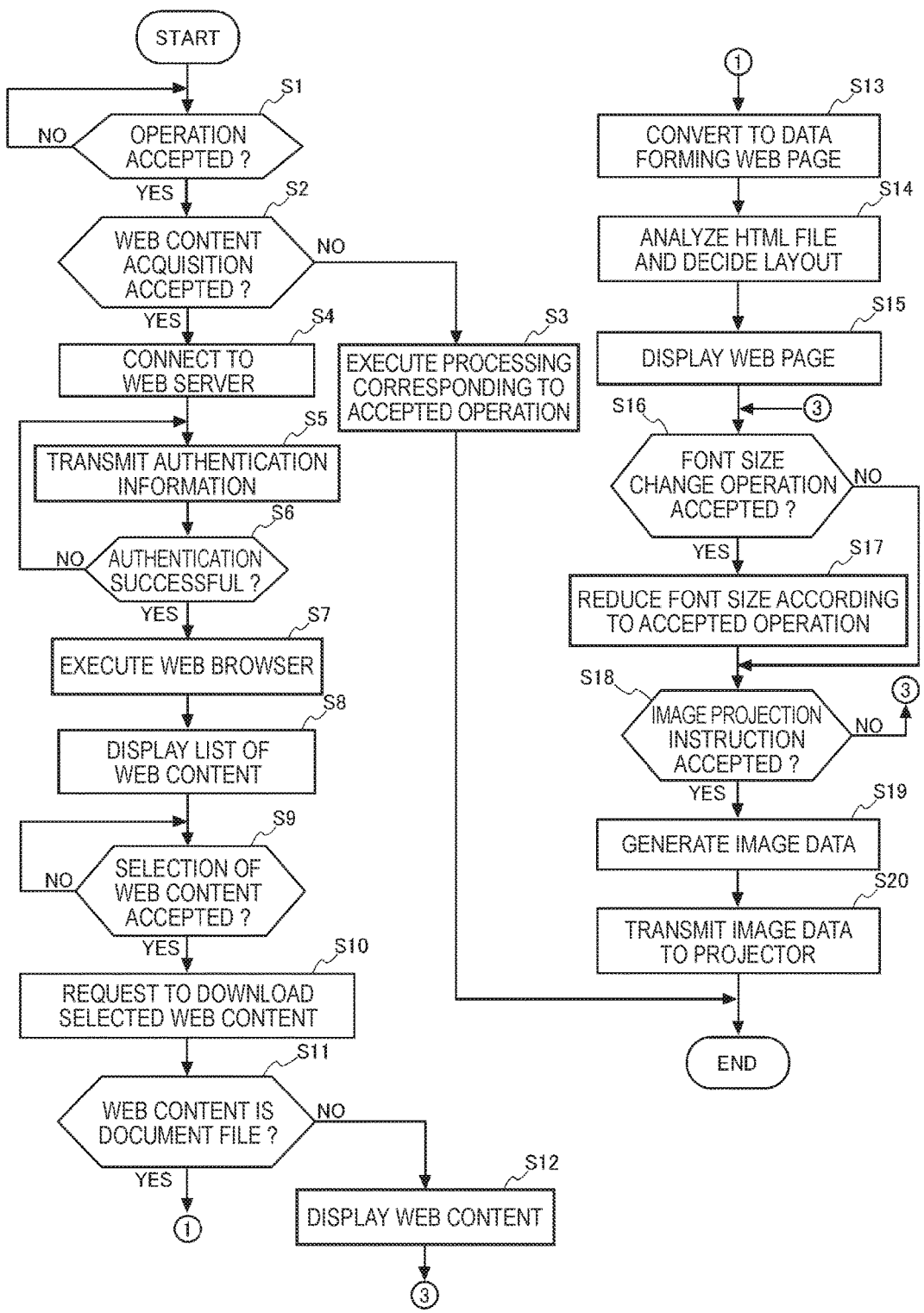
FIG. 6 is a flowchart showing the operation of the electronic apparatus.

FIG. 6 is a flowchart showing the operation of the electronic apparatus 10. In the description below, it is assumed that the control unit 180 has already connected to an access point, using the connection information 174, and is thus able to wirelessly communicate via a wireless LAN with the projector 50 similarly connecting to the access point.

The control unit 180 first determines whether a touch operation or an operation on the operation button group 140 is accepted or not (step S1). If such an operation is not accepted (NO in step S1), the control unit 180 executes another executable processing, if any, and waits until a touch operation or an operation on the operation button group 140 is accepted (step S1).

If a touch operation or an operation on the operation button group 140 is accepted (YES in step S1), the control unit 180 determines whether the accepted operation is an operation to request the acquisition of web content or not (step S2). If the accepted operation is not an operation to request the acquisition of web content (NO in step S2), the control unit 180 executes processing corresponding to the accepted operation (step S3) and ends the processing flow at this point.

Meanwhile, if the accepted operation is an operation to request the acquisition of web content (YES in step S2), the control unit 180 controls the mobile communication unit 110 to connect to the server device 30 (step S4). The control unit 180, under the control of the server device 30, causes the display panel 131 to display an authentication screen for user authentication. When a user ID and a password are inputted by a touch operation or an operation on the operation button group 140, the control unit 180 transmits the inputted user ID and password as authentication information to the server device 30 (step S5). If the control unit 180 receives a notification of authentication failure from the server device 30 as a response to the transmitted authentication information (NO in step S6), the control unit 180 requests the user to input a user ID and a password again (step S5).

Meanwhile, if the control unit 180 receives a notification of authentication success from the server device 30 (YES in step S6), the control unit 180 executes the web browser 173 (step S7) and receives web content list information from the server device 30. The web content list information is web content stored in association with the user ID used for authentication. That is, the web content list information is a list of web content saved in the server device 30 by the user of the electronic apparatus 10. The control unit 180 causes the display unit 130 to display a list of web content based on the received web content list information (step S8).

Next, the control unit 180 determines whether an operation to select web content from the displayed list of web content is accepted or not (step S9). If an operation to select web content is not accepted (NO in step S9), the control unit 180 waits until an operation to select web content is accepted. Meanwhile, if an operation to select web content is accepted (YES in step S9), the control unit 180 transmits a download request for the selected web content to the server device 30 (step S10). On receiving web content from the server device 30, the control unit 180 determines whether the received web content is a document file or not (step S11).

If the received web content is not a document file (NO in step S11), the control unit 180 causes the display unit 130 to display the received web content (step S12). Meanwhile, if the received web content is a document file (YES in step S11), the control unit 180 converts the document file into data forming a web page including an HTML file or including an HTML file and a CSS file (step S13). Next, the control unit 180 analyzes the HTML file or the CSS file included in the converted data forming the web page and decides a layout of the web page, based on the result of the analysis (step S14). The control unit 180 causes the display unit 130 to display the web page according to the decided layout (step S15).

Next, the control unit 180 determines whether a change operation to change the font size is accepted or not (step S16). If a change operation is not accepted (NO in step S16), the control unit 180 shifts to the determination of step S18. Meanwhile, if a change operation is accepted (YES in step S16), the control unit 180 changes the font size according to the accepted operation (step S17). For example, if the reduction button 136 is pressed, the control unit 180 reduces the font size at a preset reduction rate.

Next, the control unit 180 determines whether an image projection instruction is accepted or not (step S18). If an image projection instruction is not accepted (NO in step S18), the control unit 180 returns to the determination of step S16 and determines whether an operation to change the font size is accepted or not (step S16). Meanwhile, if an image projection instruction is accepted (YES in step S18), the control unit 180 generates image data based on the data forming the web page (step S19). After generating the image data, the control unit 180 transmits the generated image data to the projector 50 (step S20).

In the above flowchart, the case where the electronic apparatus 10 downloads web content from the server device 30 and causes the display unit 130 to display the web content is described. However, the web content displayed on the display unit 130 may be a document file stored in the storage unit 170. When a document file stored in the storage unit 170 is selected, the control unit 180 converts the document file into data forming a web page, analyzes an HTML file or CSS file included in the converted data forming the web page, and decides a layout of the web page, based on the result of the analysis. The control unit 180 causes the display unit 130 to display the web page with the decided layout. Subsequently, the control unit 180 executes processing in order of the procedures of steps S13 to S20 in the flowchart, on the web page displayed on the display unit 130.

As described above, the electronic apparatus 10 in the embodiment has the display unit 130, the display data generation unit 182, and the display control unit 183. The display data generation unit 182 generates data forming a web page including an HTML file or including an HTML file and a CSS file, based on a document file. The display control unit 183 analyzes the data forming the web page generated by the display data generation unit 182 and causes the display unit 130 to display the web page. The display control unit 183 changes the font size of a character included in the web page to a size that is different from a font size set based on the HMTL file or the CSS file. Therefore, in the case of generating data forming a web page from a document file, the breaking of the layout of the web page displayed on the display unit 130 can be prevented even if a change in the font, insertion of an unnecessary line feed or the like is carried out.

If the data forming the web page includes image data, the display control unit 183 changes the font size of the character to a size that is smaller than the font size set based on the HTML file or the CSS file, without changing the size of the image data.

Thus, in the case of generating data forming a web page from a document file, the breaking of the layout of the web page displayed on the display unit 130 can be prevented even if a change in the font, insertion of an unnecessary line feed or the like is carried out.

If the downloaded web content is a preset document file, the display control unit 183 causes the font size adjustment display section 135 to be displayed on the application screen 191 in order to designate a font size of a character included in the web page. Thus, a font size of the character included in the web page can be designated via the font size adjustment display section 135.

The reduction button 136 and the enlargement button 137 are displayed in the font size adjustment display section 135. When an operation on the reduction button 136 is accepted, the display control unit 183 changes the font size of the character to a size that is smaller than the font size set based on the HTML file or the CSS file.

With this configuration, when an operation on the font size adjustment display section 135 is accepted, the font size of the character is changed to a size that is smaller than a font size set based on at least one of the information of display content and the information of layout. Thus, the breaking of the layout of the web page displayed on the display unit 130 can be prevented.

The electronic apparatus 10 also has the image data conversion unit 184 and the wireless communication unit 120.

The image data conversion unit 184 generates image data to be displayed by the projector 50, based on the data forming the web page. The wireless communication unit 120 transmits the image data generated by the image data conversion unit 184 to the projector 50.

Thus, based on the data forming the web page, image data can be generated and transmitted to the projector 50.

The foregoing embodiment is a preferred embodiment of the invention. However, the invention is not limited to this and can be carried out with various modifications without departing from the spirit and scope of the invention.

For example, while an example in which the projector 50 has a liquid crystal panel is described in the embodiment, the liquid crystal panel may be a transmission-type liquid crystal panel or a reflection-type liquid crystal panel. A configuration using a digital mirror device (DMD) instead of a liquid crystal panel may be employed as well.

Each functional unit of the electronic apparatus 10 shown in FIG. 2 represents a functional configuration and is not particularly limited to a specific form of installation. That is, there is no need to install hardware corresponding to each individual functional unit. As a matter of course, a single processor may execute programs to implement functions of a plurality of functional units. Also, in the embodiment, a part of the functions implemented by software may be implemented by hardware, and a part of the functions implemented by hardware may be implemented by software. Moreover, specific details of the configurations of the other parts of the projector can be changed arbitrarily without departing from the spirit and scope of the invention.

The unit of processing in the flowchart shown in FIG. 6 is divided according to the principal content of processing in order to facilitate understanding of the processing by the control unit 180 of the electronic apparatus 10. The invention is not limited by the way the unit of processing shown in the flowchart of FIG. 6 is divided or its name. The processing by the control unit 180 can also be divided into many more units of processing according to the content of processing and can also be divided in such a way that one unit of processing includes many more processing steps. The order of processing in the flowchart is not limited to the illustrated example, either.

In the embodiment, the case where the basic control program 171 and the application program 172 executed by the electronic apparatus 10 are stored in the storage unit 170 is described as an example. However, these programs need not necessarily be stored in the storage unit 170. For example, the programs may be stored in a computer-readable portable storage medium such as a flexible disk (FD), DVD, or DVD-RAM, or a portable storage medium such as a CD-ROM, CD-R/RW, magneto-optical disk, or IC card. The programs may also be stored in advance in a server device connected to the electronic apparatus 10 via a public line, the internet, LAN, WAN or the like, and the electronic apparatus 10 may read out and execute the programs from the server device. Also, the programs may be stored in a portable storage medium or a storage medium from the server device via a pubic line, the internet, LAN, WAN or the like, and the electronic apparatus 10 may read out and execute the programs.

The entire disclosure of Japanese Patent Application No. 2017-085812, filed Apr. 25, 2017 is expressly incorporated by reference herein.

What is claimed is:

1. An electronic apparatus comprising:
   a display unit;
   a display data generation unit which generates a web file including display content information and layout information, based on a data file; and
   a display control unit which causes the display unit to:
      display an image based on the web file;
      if the data file is in a preset file format, cause a size designation screen to be displayed to designate a font size of a character included in the image based on the web file displayed on the display unit; and
      display the character, changing a font size of the character to a second font size that is different from a first font size set based on the web file.

2. The electronic apparatus according to claim 1, wherein if the web file includes image data, the display control unit causes the display unit to display the character in the second font size that is smaller than the first font size, without changing a size of the displayed image.

3. The electronic apparatus according to claim 1, further comprising:
   an accepting unit which accepts an operation,
   wherein when the accepting unit accepts an operation on the size designation screen, the display control unit changes the font size of the character to the second font size that is smaller than the first font size.

4. The electronic apparatus according to claim 1, further comprising:
   an image data generation unit which generates image data to be displayed by a display device, based on the web file; and
   a transmission unit which transmits the image data generated by the image data generation unit to the display device.

5. The electronic apparatus according to claim 1, wherein the second font size is smaller than the first font size, and the display control unit causes the display unit to display a character frame included in the web file and display the character in the second font size without changing a size of the character frame.

6. A program executed by a computer installed in an electronic apparatus, the program causing the computer to execute:
   generating a web file including display content information and layout information, based on a data file;
   causing a display unit provided in the electronic apparatus to display an image based on the web file;
   if the data file is in a preset file format, causing a size designation screen to be displayed to designate a font size of a character included in an image based on the web file displayed on the display unit; and
   causing the display unit to display a the character, changing a font size of the character to a second font size that is different from a first font size set based on the web file.

7. The program according to claim 6, wherein if the web file includes image data, the program causes the computer to further execute:
   causing the display unit to display the character, changing the font size of the character to the second font size that is smaller than the first font size, without changing a size of the displayed image.

8. The program according to claim 6, wherein
   the electronic apparatus includes an accepting unit which accepts an operation, and
   the program causes the computer to further execute changing the font size of the character to the second font size that is smaller than the first font size, when the accepting unit accepts an operation on the size designation screen.

9. The program according to claim 6, wherein the program causes the computer to further execute:
   generating image data to be displayed by a display device, based on the web file; and
   transmitting the generated image data to the display device.

10. A method for controlling an electronic apparatus, the method comprising:
    generating a web file including display content information and layout information, based on a data file;
    causing a display unit provided in the electronic apparatus to display an image based on the web file;
    causing a size designation screen to be displayed to designate a font size of a character included in an image based on the web file displayed on the display unit, if the data file is in a preset file format; and
    causing the display unit to display the character, changing a font size of the character to a second font size that is different from a first font size set based on the web file.

11. The method for controlling the electronic apparatus according to claim 10, further comprising:
    if the web file includes image data, causing the display unit to display the character, changing the font size of the character to the second font size that is smaller than the first font size, without changing a size of the displayed image.

12. The method for controlling the electronic apparatus according to claim 10, wherein the electronic apparatus includes an accepting unit which accepts an operation, and the method further comprises:
    changing the font size of the character to the second font size that is smaller than the first font size, when the accepting unit accepts an operation on the size designation screen.

13. The method for controlling the electronic apparatus according to claim 10, further comprising:
   generating image data to be displayed by a display device, based on the web file; and
   transmitting the generated image data to the display device.

* * * * *